April 6, 1965 K. GOERGEN 3,177,044
ULTRACENTRIFUGE OIL PRESSURE BEARINGS
Filed Jan. 23, 1963 2 Sheets-Sheet 1

INVENTOR:
KARL GOERGEN
BY Robert H. Jacob
AGT.

INVENTOR
KARL GOERGEN 3,177,044
ULTRACENTRIFUGE OIL PRESSURE BEARINGS
Karl Goergen, Basel, Switzerland, assignor to Firma Martin Christ, Osterode, Harz, Germany
Filed Jan. 23, 1963, Ser. No. 253,787
Claims priority, application Germany, Jan. 25, 1962,
C 26,088
6 Claims. (Cl. 308—134.1)

The invention relates to oil pressure bearings and particularly to an oil pressure bearing for rapidly rotating centrifuges, which are also known as ultracentrifuges. With centrifuges of this kind a rotor is fitted on a vertically arranged shaft, which rotates in a working chamber which is preferably under the influence of a vacuum.

With centrifuges of the said kind the bearing arrangements for the rotor shaft involve particular difficulties, as on the one hand they have to be fitted to a vacuum chamber and must therefore be airtight and on the other hand the shaft is rotating in its bearings at an extremely high r.p.m.

It is therefore provided in accordance with the invention that the shaft passes through a chamber and carries a disc fixedly connected with it, that the chamber is connected below the disc to a pressure oil pipe and that in the vicinity of the vertical level which the disc is to assume during operation, a discharge aperature is provided in the chamber. The result of this is that the shaft rises during operation and floats on the oil, so that the height of the discharge aperture determines the operational position of the shaft.

The oil pressure bearing is preferably formed also as a vacuum seal in a manner, that the shaft has spiral screwthreads at the point of entrance into the working chamber, which screwthreads rise in the direction of rotation of the shaft. This prevents any escape of oil from the oil pressure chamber into the working chamber surrounding the rotor.

Figure 2:
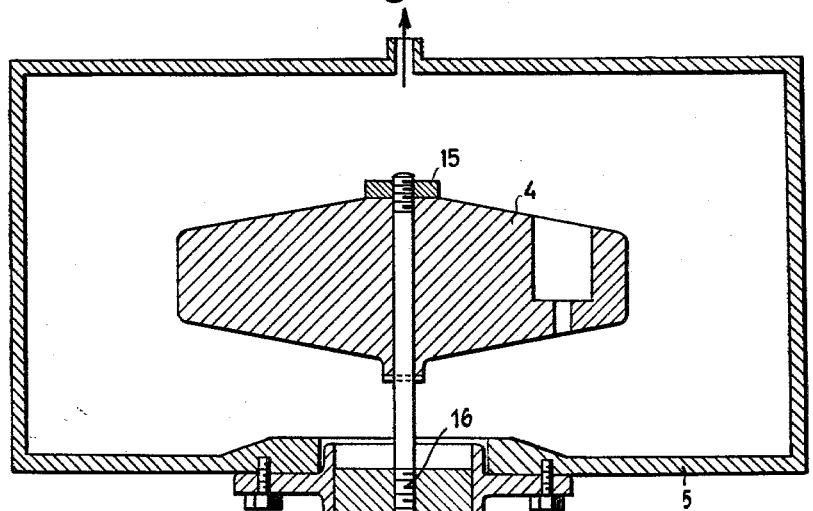
Figure 1:
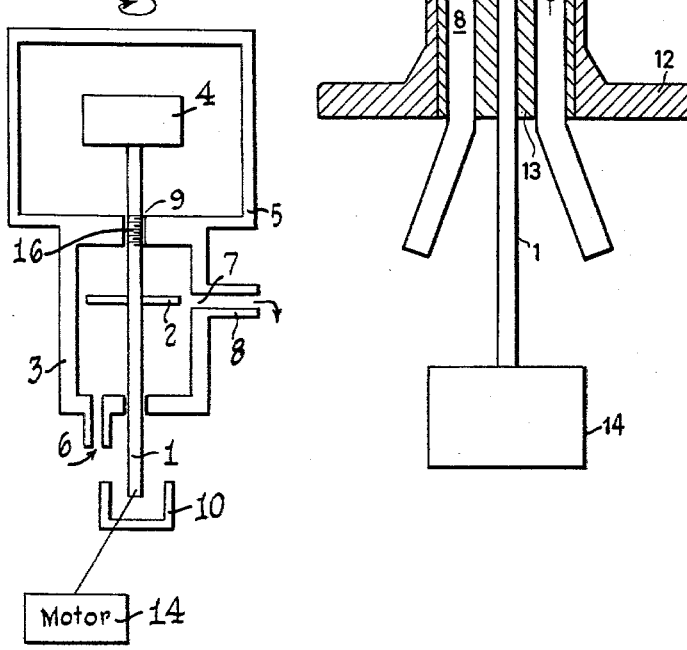
Figure 2A:
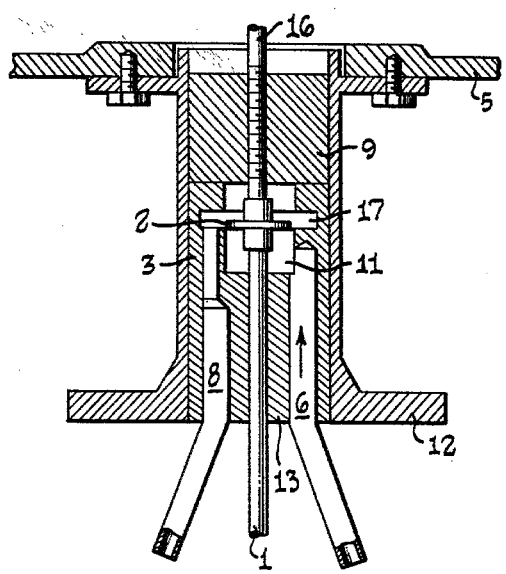
Figure 2B:
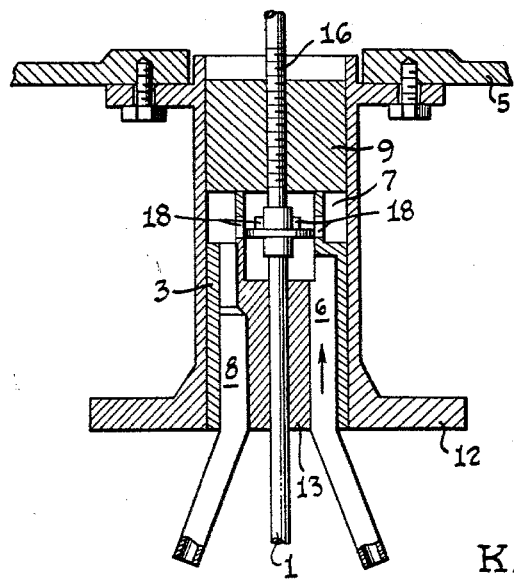

The invention will be described in more detail by way of example with reference to the accompanying drawings, in which:

FIGURE 1 shows a diagrammatic representation of an arrangement embodying the invention, FIGURE 2 shows in a vertical section details of the oil pressure bearing embodying the invention, FIGURE 2A is a modification of the embodiment illustrated in FIGURE 2, and FIGURE 2B is a further modification showing a different oil chamber.

In the drawings there is shown a rotor shaft 1, to the upper end of which a rotor 4 is secured. The rotor 4 rotates in a housing 5 which is preferably evacuated and constitutes a vacuum chamber. A disc 2, which is surrounded by a housing 3 is secured to the shaft 1. Oil under pressure is introduced into the housing 3 through a pipe or duct 6, so that the disc 2 and hence the rotor shaft 1 are raised until the disc 2 is located in the vicinity of an aperture 7 of a discharge pipe or duct 8 so that the shaft 1 with the rotor 4 is maintained in floating condition. The actual weight of the rotor and the shaft is supported in this manner in a substantially frictionless condition.

As can be seen in particular from FIGURE 2, the oil feed pipe 6 is in communication with an annular chamber 11 surrounding the rotor shaft 1, and corresponding in diameter substantially to the disc 2. The chamber 11 is separated by a partition 11a from the discharge pipe 8. Above the disc 2 an annular oil discharge chamber 7 is formed.

As can be seen from FIGURE 1 the upper shaft bearing 9 can simultaneously form a vacuum seal if the shaft 1 is provided at the point of entry into the housing 5 with screwthreads 16, which not only prevent the oil from escaping from the housing 3 during rotation of the shaft, but actually press it back into the space enclosed by the said housing.

A trap pan 10 is provided for any oil escaping at the lower shaft bearing. This oil is preferably fed to a pump (not shown) feeding the oil under pressure through the pipe 6, at its low pressure side.

Corresponding screwthreads can also be provided on the rotor shaft at the lower shaft bearing. In this case the pitch of the screwthreads must be opposite in direction to the pitch of the screwthreads provided at the upper bearing.

In the example shown in FIGURE 2 the lower shaft bearing is designated by 13, while 12 is a housing which holds the shaft bearing. A knurled nut 15 is used for fixnig the rotor 4 to the shaft 1. The rotor shaft 1 and hence the rotor 4 are set in rotation by an electric motor 14 indicated diagrammatically in FIGS. 1 and 2 of the drawings.

In order to control the level to which the rotor shaft 1 is raised under the action of the oil pressure on the disc 2 or to be able to adapt the shaft to operating conditions, either the disc 2 can be surrounded by a housing enclosing it with a uniform overall clearance, between which housing and the rim of the disc an annular groove is left free; or it is also possible to increase the diameter of the housing, preferably near the discharge pipe as seen in FIGURE 2. This increase in size may also be in the form of an annular groove 17 connected with the discharge aperture as in FIG. 2A. Instead of only one discharge aperture, from the housing surrounding the disc, several discharge aperatures 18 as shown in FIG. 2B distributed over its periphery may lead from the housing to unite inside or outside the housing to form a single duct.

I claim:

1. In an ultracentrifuge having a vacuum chamber, a rotor disposed in said vacuum chamber, said rotor having a downwardly extending vertically disposed shaft, a motor secured to the lower end of said shaft, means defining an oil pressure bearing including a housing disposed around said shaft intermediate said motor and said rotor and secured to the bottom of said vacuum chamber, an upper bearing and a lower bearing mounted in said housing and supporting said shaft for rotary and axial movement therein, a cylindrical bore defined in said housing around and coaxially of said shaft, a disc provided on said shaft in the area of said bore having a diameter corresponding substantially to the diameter of said bore, a supply duct for oil under pressure connected to the lower end of said bore below said disc, an oil chamber above and in communication with said bore and a discharge duct extending from proximate said oil chamber to the exterior of said housing.

2. In an ultracentrifuge having a vacuum chamber, a rotor disposed in said vacuum chamber, said rotor having a downwardly extending vertically disposed shaft, a motor secured to the lower end of said shaft, means defining an oil pressure bearing including a housing disposed around said shaft intermediate said motor and said rotor and secured to the bottom of said vacuum chamber, an upper bearing and a lower bearing mounted in said housing and supporting said shaft for rotary and axial movement therein, a cylindrical bore defined in said housing around and coaxially of said shaft, a disc provided on said shaft in the area of said bore having a diameter corresponding substantially to the diameter of said bore, a supply duct for oil under pressure connected to the lower end of said bore below said disc, an oil chamber above and in communication with said bore and a discharge duct extending from proximate said oil chamber to the exterior of said housing, said oil chamber having an annular groove communicating with said discharge duct.

3. In an ultracentrifuge having a vacuum chamber, a rotor disposed in said vacuum chamber, said rotor having a downwardly extending vertically disposed shaft, a motor secured to the lower end of said shaft, means defining an oil pressure bearing including a housing disposed around said shaft intermediate said motor and said rotor and secured to the bottom of said vacuum chamber, an upper bearing and a lower bearing mounted in said housing and supporting said shaft for rotary and axial movement therein, a cylindrical bore defined in said housing around and coaxially of said shaft, a disc provided on said shaft in the area of said bore having a diameter corresponding substantially to the diameter of said bore, a supply duct for oil under pressure connected to the lower end of said bore below said disc, an oil chamber above and in communication with said bore and a discharge duct extending from proximate said oil chamber to the exterior of said housing, said oil chamber having a plurality of discharge apertures disposed proximate said bore.

4. In an ultracentrifuge having a vacuum chamber, a rotor disposed in said vacuum chamber, said rotor having a downwardly extending vertically disposed shaft, a motor secured to the lower end of said shaft, means defining an oil pressure bearing including a housing disposed around said shaft intermediate said motor and said rotor and secured to the bottom of said vacuum chamber, an upper bearing and a lower bearing mounted in said housing and supporting said shaft for rotary and axial movement therein, a cylindrical bore defined in said housing around and coaxially of said shaft, a disc provided on said shaft in the area of said bore having a diameter corresponding substantially to the diameter of said bore, a supply duct for oil under pressure connected to the lower end of said bore below said disc, an oil chamber above and in communication with said bore, a discharge duct extending from proximate said oil chamber to the exterior of said housing, and said shaft having a threaded portion proximate the bottom of said vacuum chamber with threads pitched in the direction of rotation of said shaft.

5. In an ultracentrifuge having a vacuum chamber, a rotor disposed in said vacuum chamber, said rotor having a downwardly extending vertically disposed shaft, a motor secured to the lower end of said shaft, means defining an oil pressure bearing including a housing disposed around said shaft intermediate said motor and said rotor and secured to the bottom of said vacuum chamber, an upper bearing and a lower bearing mounted in said housing and supporting said shaft for rotary and axial movement therein, a cylindrical bore defined in said housing around and coaxially of said shaft, a disc provided on said shaft in the area of said bore having a diameter corresponding substantially to the diameter of said bore, a supply duct for oil under pressure connected to the lower end of said bore below said disc, an oil chamber above and in communication with said bore and a discharge duct extending from proximate said oil chamber to the exterior of said housing, said oil chamber comprising an annular groove of a height determining the operational position of said disc and thereby of said shaft.

6. In an ultracentrifuge having a vacuum chamber, a rotor disposed in said vacuum chamber, said rotor having a downwardly extending vertically disposed shaft, a motor secured to the lower end of said shaft, means defining an oil pressure bearing including a housing disposed around said shaft intermediate said motor and said rotor and secured to the bottom of said vacuum chamber, an upper bearing and a lower bearing mounted in said housing and supporting said shaft for rotary and axial movement therein, a cylindrical bore defined in said housing around and coaxially of said shaft, a disc provided on said shaft in the area of said bore having a diameter corresponding substantially to the diameter of said bore, a supply duct for oil under pressure connected to the lower end of said bore below said disc, an oil chamber above and in communication with said bore, a discharge duct extending from proximate said oil chamber to the exterior of said housing, said oil chamber comprising an annular groove of a height determining the operational position of said disc and thereby of said shaft, and said shaft having a threaded portion proximate the bottom of said vacuum chamber with threads pitched in the direction of rotation of said shaft.

References Cited by the Examiner

UNITED STATES PATENTS 669,601    3/01    Snow _____ 308—9

FOREIGN PATENTS 1,202,854    7/59    France.

ROBERT C. RIORDON, *Primary Examiner.*
FRANK SUSKO, *Examiner.*